United States Patent
Li et al.

(10) Patent No.: US 9,258,048 B2
(45) Date of Patent: Feb. 9, 2016

(54) METHOD AND TERMINAL FOR FEEDING BACK CHANNEL STATE INFORMATION

(75) Inventors: Ruyue Li, Shenzhen (CN); Jun Xu, Shenzhen (CN); Yijian Chen, Shenzhen (CN); Bo Dai, Shenzhen (CN); Junfeng Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 498 days.

(21) Appl. No.: 13/695,431

(22) PCT Filed: Mar. 10, 2011

(86) PCT No.: PCT/CN2011/071702
§ 371 (c)(1),
(2), (4) Date: Nov. 23, 2012

(87) PCT Pub. No.: WO2011/134322
PCT Pub. Date: Nov. 3, 2011

(65) Prior Publication Data
US 2013/0064128 A1 Mar. 14, 2013

(30) Foreign Application Priority Data
Apr. 30, 2010 (CN) .......................... 2010 1 0174900

(51) Int. Cl.
*H04L 12/26* (2006.01)
*H04B 7/06* (2006.01)
(Continued)

(52) U.S. Cl.
CPC .............. *H04B 7/065* (2013.01); *H04B 7/0478* (2013.01); *H04L 1/0026* (2013.01); *H04L 1/0029* (2013.01); *H04B 7/0452* (2013.01); *H04B 7/0639* (2013.01)

(58) Field of Classification Search
CPC ... H04W 24/00; H04L 43/50; H04L 43/0852; H04L 43/08; H04B 17/003
USPC .................................. 370/252, 254, 255, 248
See application file for complete search history.

(56) References Cited

U.S. PATENT DOCUMENTS 8,315,346 B2   11/2012   Kim et al.
2007/0026808 A1*   2/2007   Love et al. ................... 455/67.7
(Continued)

FOREIGN PATENT DOCUMENTS

CN   101689904   3/2010
CN   101867447   10/2010
(Continued)

OTHER PUBLICATIONS

Discussion on unified framework for multi-granular feedback, Apr. 12-16, 2010, 3GPP TSG RAN WG1 Meeting #60bis R1-101838.*
(Continued)

*Primary Examiner* — Hassan Phillips
*Assistant Examiner* — Siren Wei
(74) *Attorney, Agent, or Firm* — Pearl Cohen Zedek Latzer Baratz LLP

(57) ABSTRACT

The present invention discloses method and terminal for feeding back channel state information. The method comprises: UE determining channel state information comprising first-type PMI and/or second-type PMI according to indication information, wherein first-type PMI is used for indicating index of one first precoding matrix in first precoding codebook, each first precoding matrix is used for mapping channel information of one wideband and/or long-term channel; second-type PMI is used for indicating index of one second precoding matrix in second precoding codebook, each second precoding matrix is used for mapping channel information of one subband and/or short-term channel; UE feeding back first-type PMI in PUCCH periodically and feeding back second-type PMI in PUSCH periodically or non-periodically, or, feeding back first-type PMI and second-type PMI in PUCCH. Through the present invention, precision of feeding back channel state information by UE is increased, and base station can dynamically select SU-MIMO or MU-MIMO transmission.

12 Claims, 2 Drawing Sheets

```
┌─────────────────────────────────────────────┐
│ The UE determines the channel state         │
│ information comprising the first-type PMI   │──S102
│ and/or the second-type PMI according to     │
│ indication information                      │
└─────────────────────┬───────────────────────┘
                      │
                      ▼
┌─────────────────────────────────────────────┐
│ The UE feeds back the first-type PMI in a   │
│ PUCCH periodically and feeds back the       │
│ second-type PMI in a PUSCH periodically or  │──S104
│ non-periodically, or, the UE feeds back the │
│ first-type PMI and the second-type PMI in   │
│ the PUCCH                                   │
└─────────────────────────────────────────────┘
```

(51) Int. Cl.
H04L 1/00 (2006.01)
H04B 7/04 (2006.01)

(56) References Cited

U.S. PATENT DOCUMENTS

2008/0305745 A1* 12/2008 Zhang et al. .............. 455/67.11
2009/0006925 A1* 1/2009 Pan ............................. 714/758
2010/0098012 A1* 4/2010 Bala et al. .................... 370/329
2010/0165931 A1* 7/2010 Nimbalker et al. ......... 370/329

FOREIGN PATENT DOCUMENTS

EP          1777855 A1      4/2007
JP          2009-530898     8/2009
WO       WO 2009/088225    7/2009

OTHER PUBLICATIONS

LTE; Evolved Universal Terrestrial Radio Access (E-UTRA); Physical layer procedures, Apr. 2010, 3GPP TS 36.213 version 9.1.0 Release 9, p. 35-50.*
Multi-granular feedback design for LTE-A, Apr. 12-16, 2010, 3GPP TSG RAN WG1 Meeting #60bis R1-101837.*
ZTE., Discussion on unified framework for multi-granular feedback, 3GPP TSG RAN WG1 Meeting #60bis, R1-101838, Apr. 12, 2010.
ZTE., Multi granular feedback design for LTE-A, 3GPPTSG RAN WGI Meeting #60bis, RI-I01837, Apr. 12, 2010.
International Search Report for International Application No. PCT/CN2011/071702 mailed Jun. 23, 2011.
"3rd Generation Partnership Project, Technical Specification Group Radio Access Network; Evolved Universal Terrestrial Radio Access (E-UTRA); Physical layer procedures (Release 9)", 3GPP Standard; 3GPP TS 36.213, 3rd Generation Partnership Project (3GPP), Mobile Competence Centre; 650, Route Des Lucioles; F-06921 Sophia-Antipolis Cedex, France, Mar. 2010.
Ericsson, ST-Ericsson, "PMI-based Multi-Granular Feedback for SU/MU-MIMO Operation", 3GPP TSG-RAN WG1 #60, San Francisco, USA, Feb. 22-26, 2010.
"Way forward on Rel. 10 feedback; RAN WG1", R1-102579, 3GPP TSG RAN WG1 Meeting #60bis, Beijing, China, Apr. 12-16, 2010, Agenda Item: 6.3.4.2.

* cited by examiner

METHOD AND TERMINAL FOR FEEDING BACK CHANNEL STATE INFORMATION

CROSS-REFERENCE TO RELATED APPLICATIONS

This application is a National Phase Application of PCT International Application No. PCT/CN2011/071702, International Filing Date Mar. 10, 2011, claiming priority of Chinese Patent Application No. 201010174900.X, filed Apr. 30, 2010, the contents of each of which are hereby incorporated by reference.

FIELD OF THE INVENTION

The present invention relates to the technical field of mobile communications, in particular to a method and a terminal for feeding back channel state information (CSI).

BACKGROUND OF THE INVENTION

As an evolved standard of Long Term Evolution (LTE), a Long Term Evolution Advanced (LTE-A) system supports larger system bandwidth (the largest bandwidth being 100 MHz) and is backward compatible with the existing LTE standard. In order to increase the coverage and throughput of cell edges, based on the existing LTE system, the LTE-A proposes a cooperative Multiple Input Multiple Output (MIMO) technology, also known as a Cooperation Multipoint Transmission technology (COMP), which is able to increase the spectrum utilization efficiency of an International Mobile Telecommunications-Advance (IMT-Advance) system and alleviate shortage of spectrum resources.

In wireless telecommunications, if multiple antennas are used at a transmitting terminal (e.g. node eNB), the transmission rate can be increased by spatial multiplexing, in which different data are transmitted at different antenna positions on the same time frequency resource of the transmitting terminal. Also, multiple antennas are used at a receiving terminal (e.g. a piece of User Terminal (UE)). In one case, resources of all antennas are allocated to the same user in a single user condition, i.e. in one transmission interval, one user device separately occupies all physical resources allocated to the user device, and this transmission mode is called Single-User MIMO (SU-MIMO). In another case, resources of different antenna spaces are allocated to different users in a multi-user condition, i.e. in one transmission interval, one user device and at least one other user device share physical resources allocated to these user devices, the one user device and other user devices share the same physical resource, which can be a time-frequency resource, via space division multiple access or space division multiplexing, and this transmission mode is called Multi-User MIMO (MU-MIMO).

In the LTE technology of the 3rd Generation Partnership Project (3GPP), a UE is set semi-statically via a high layer signalling to perform transmission based on one of the following transmission modes, such as:
  Mode 1: single-antenna port: port 0;
  Mode 2: transmit diversity;
  Mode 3: open-loop spatial multiplexing;
  Mode 4: closed-loop spatial multiplexing;
  Mode 5: Multi-user MIMO;
  Mode 6: closed-loop rank=1 precoding; and
  Mode 7: single-antenna port: port 5.

The UE feeds back different channel state information to the transmitting terminal according to different transmission modes, and then the transmitting terminal (eNB) performs scheduling according to the channel state information fed back by the terminal (UE), and configures new channel state information for actual transmission according to a certain principle (e.g. a maximum capacity principle). The fed-back channel state information comprises: Channel Quality Indication (CQI) information, Precoding Matrix Indicator (PMI) information and Rank Indicator (RI) information.

The CQI is an index for measuring the quality of a downlink channel. In the 36-213 protocol, the CQI is expressed by integer values of 0 to 15 which respectively represent different CQI grades. Different CQIs are corresponding to their respective modulation and coding schemes (MCS).

The RI is used for describing the number of spatial independent channels and is corresponding to the rank of a channel response matrix. Under the open-loop spatial multiplexing mode and the closed-loop spatial multiplexing mode, the UE needs to feed back the RI information, and the RI information does not need to be fed back under other modes.

The PMI is an index number of a precoding codebook fed back by the UE. Under the closed-loop spatial multiplexing mode, the MU-MIMO mode and the R1=1 closed-loop mode, the PMI information needs to be fed back and the PMI information is not fed back under other transmission modes.

At present, the channel state information is fed back via a certain number of bits (e.g. 4 bits) in the related art, which is mainly applied to the SU-MIMO transmission mode, therefore, the fed-back information is simple with low precision. However, with the development of communication technologies, the transmission mode of dynamic switching between the SU-MIMO and the MU-MIMO is applied more and more widely in the LTE-A, and this transmission mode has higher requirements for the contents and precision of the fed-back channel state information. The original feedback method can no longer meet the requirement of the LTE-A system, especially the requirement for high precision of the channel state information under the transmission mode of dynamic switching between the SU-MIMO and the MU-MIMO.

SUMMARY OF THE INVENTION

The present invention provides a method and a terminal for feeding back channel state information, which solve the problem in the related art that the original feedback method can no longer meet the requirement of the LTE-A system, especially the requirement for high precision of the channel state information under the transmission mode of dynamic switching between the SU-MIMO and the MU-MIMO.

In one aspect, the present invention provides a method for feeding back channel state information, comprising: a piece of User Equipment (UE) determining channel state information which comprises a first-type Precoding Matrix Index (PMI) and/or a second-type PMI according to indication information, wherein the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel; and the UE feeding back the first-type PMI in a Physical Uplink Control Channel (PUCCH) periodically and feeding back the second-type PMI in a Physical Uplink Shared Channel (PUSCH) periodically or non-periodically; or, feeding back the first-type PMI and the second-type PMI in the PUCCH.

Preferably, the step of the UE determining that fed-back channel state information comprises the first-type PMI and/or the second-type PMI according to the indication information comprises: the UE receiving high layer configuration signaling information from a base station and determining that a transmission mode of the UE is a mixed transmission mode; the UE determining a feedback mode of the UE according to the high layer configuration signaling information; and the UE determining the channel state information which comprises the first-type PMI and/or the second-type PMI according to the determined feedback mode.

Preferably, the mixed transmission mode supports at least one of the following transmission modes: a Single-User Multiple Input Multiple Output (SU-MIMO) transmission mode, a Multi-User Multiple Input Multiple Output (MU-MIMO) transmission mode, and an SU-MIMO/MU-MIMO dynamic switching transmission mode.

Preferably, the channel state information further comprises: Rank Indicator (RI) information and/or Channel Quality Indication (CQI) information.

Preferably, the step of the UE feeding back the first-type PMI in the PUCCH periodically and feeding back the second-type PMI in the PUSCH periodically or non-periodically; or, feeding back the first-type PMI and the second-type PMI in the PUCCH comprises: the UE feeding back the first-type PMI in the PUCCH periodically in a Mode 1-1, or a Mode 0-1, or a Mode 0-2, and feeding back the second-type PMI in the PUSCH; or, the UE feeding back the first-type PMI in the PUCCH in a Mode 1-1, or a Mode 0-1, or a Mode 0-2 and feeding back the second-type PMI in the PUCCH.

Preferably, the step of the UE feeding back the first-type PMI in the PUCCH periodically in the Mode 1-1 comprises: the UE selecting the first precoding matrix corresponding to a single wideband from the stored first precoding codebook using a latest RI, and taking an index number of the selected first precoding matrix as the first-type PMI of the single wideband; the UE computing a CQI of the single wideband using the latest RI; and the UE feeding back the CQI of the single wideband and the first-type PMI of the single wideband in the PUCCH periodically.

Preferably, the step of the UE computing the CQI of the single wideband using the latest RI comprises: the UE computing the CQI of the single wideband using the latest RI and the selected first precoding matrix of the single wideband.

Preferably, the step of the UE computing the CQI of the single wideband using the latest RI comprises: the UE judging that the latest RI is larger than 1; and the UE computing a differential CQI of the wideband using the latest RI.

Preferably, the step of the UE feeding back the first-type PMI in the PUCCH periodically in the Mode 0-1 comprises: the UE selecting the first precoding matrix corresponding to a single wideband from the stored first precoding codebook using a latest RI, and taking an index number of the selected first precoding matrix as the first-type PMI of the single wideband; and the UE feeding back the first-type PMI of the single wideband in the PUCCH periodically.

Preferably, the step of the UE feeding back the first-type PMI in the PUCCH periodically in the Mode 0-2 comprises: the UE selecting multiple first precoding matrixes respectively corresponding to multiple widebands from the stored first precoding codebook using a latest RI, and taking index numbers of the selected multiple first precoding matrixes as multiple first-type PMIs of the multiple widebands; and the UE feeding back the multiple first-type PMIs of the multiple widebands in the PUCCH periodically.

Preferably, the step of the UE feeding back the first-type PMI in the PUCCH periodically in the Mode 0-2 comprises: the UE selecting the first precoding matrix corresponding to each subband in multiple widebands from the stored first precoding codebook using a latest RI, and taking an index number of the selected first precoding matrix as the first-type PMI of each subband in the multiple widebands; and the UE feeding back, in the PUCCH, the first-type PMI of each subband in the multiple widebands periodically.

Preferably, before the step of the UE feeding back the first-type PMI in the PUCCH periodically, the method further comprises: the UE setting a feedback period of the RI as N times of a feedback period of the first-type PMI, wherein N is a natural number larger than 0; or, the UE setting the feedback period of the first-type PMI as N times of the feedback period of the RI, wherein N is a natural number larger than 0.

Preferably, the step of the UE feeding back the first-type PMI in the PUCCH periodically and feeding back the second-type PMI in the PUSCH, or the UE feeding back the first-type PMI and the second-type PMI in the PUCCH comprises: the UE feeding back the first-type PMI in the PUCCH periodically, and feeding back the second-type PMI in the PUSCH in a Mode 1-2 or a Mode 2-2; or, the UE feeding back the first-type PMI and the second-type PMI in the PUCCH.

Preferably, the step of the UE feeding back the second-type PMI in the PUSCH in the Mode 1-2 comprises: the UE selecting the second precoding matrix corresponding to each subband in multiple widebands from the stored second precoding codebook, and taking an index number of the selected second precoding matrix as the second-type PMI of each subband in the multiple widebands; the UE computing a wideband CQI of each code stream of the multiple widebands using a latest RI, wherein the CQI adopts a non-differential CQI format; and the UE feeding back wideband CQIs of the multiple widebands and the second-type PMI of each subband of the multiple widebands in the PUSCH.

Preferably, the step of the UE feeding back the second-type PMI in the PUSCH in the Mode 2-2 comprises: the UE selecting the second precoding matrix corresponding to each subband in multiple widebands from the stored second precoding codebook, and taking an index number of the selected second precoding matrix as the second-type PMI of each subband in the multiple widebands; the UE computing a CQI of each subband in the multiple widebands using a latest RI, wherein the CQI adopts a differential CQI format or an ordinary CQI format; and the UE feeding back, in the PUSCH, the CQI of each subband in the multiple widebands and the second-type PMI of each subband in the multiple widebands.

Preferably, the step of the UE feeding back the first-type PMI in the PUCCH periodically and feeding back the second-type PMI in the PUSCH, or the UE feeding back the first-type PMI and the second-type PMI in the PUCCH comprises: the UE feeding back the first-type PMI in the PUCCH periodically and feeding back the second-type PMI in the PUSCH; or, the UE feeding back the first-type PMI in the PUCCH, and feeding back the second-type PMI in the PUCCH in a mode of single UE-selected subband PMI, or a mode of single UE-selected subband CQI and single UE-selected subband PMI, or a mode of CQI and PMI of a single Bandwidth Part (BP).

Preferably, the step of the UE feeding back the second-type PMI in the PUCCH in the mode of single UE-selected subband PMI comprises: the UE selecting one subband from each BP in multiple BPs; the UE selecting the second precoding matrix corresponding to the one subband selected from each BP from the stored second precoding codebook, and taking an index number of the selected second precoding matrix as the second-type PMI of the one subband of each BP; and the UE feeding back, in the PUCCH, the second-type PMI of the one subband selected from each BP in the multiple BPs and a subband location identifier of the subband.

Preferably, the step of the UE selecting one subband from each BP in the multiple BPs comprises: the UE determining an RI of the multiple BPs; and the UE selecting one subband from each BP in the multiple BPs according to the RI, the first-type PMI of the multiple BPs and the second-type PMI of each subband of the multiple BPs.

Preferably, the step of the UE feeding back the second-type PMI in the PUCCH in the mode of single UE-selected subband CQI and single UE-selected subband PMI comprises: the UE selecting one subband from each BP in multiple BPs; the UE selecting the second precoding matrix corresponding to each selected subband from the stored second precoding codebook, and taking an index number of the selected second precoding matrix as the second-type PMI of each selected subband; the UE computing CQIs of all selected subbands; and the UE feeding back, in the PUCCH, the second-type PMI of each selected subband, the CQIs of all the selected subbands and subband location identifiers of all the subbands.

Preferably, the step of the UE selecting one subband from each BP in the multiple BPs comprises: the UE determining an RI of the multiple BPs; and the UE selecting one subband from each BP in the multiple BPs according to the RI, the first-type PMI of the multiple BPs and the second-type PMI of each subband of the multiple BPs.

Preferably, the step of the UE computing the CQIs of all the selected subbands comprises: the UE computing the CQIs of all the selected subbands according to the RI, the first-type PMI of the multiple BPs and the second-type PMI of each subband of the multiple BPs.

Preferably, the step of the UE feeding back the second-type PMI in the PUCCH in the mode of CQI and PMI of the single BP comprises: the UE selecting one subband from each BP in multiple BPs; the UE selecting second precoding matrixes corresponding to all selected subbands from the stored second precoding codebook, and taking index numbers of the selected second precoding matrixes as second-type PMIs of all the selected subbands; the UE computing CQIs of all the selected subbands; and the UE feeding back, in the PUCCH, the second-type PMIs of all the selected subbands, the CQIs of all the selected subbands and subband location identifiers of all the selected subbands.

Preferably, the step of the UE selecting one subband from each BP in the multiple BPs comprises: the UE determining RI of the multiple BPs; and the UE selecting one subband from each BP in the multiple BPs according to the RI, the first-type PMI of the multiple BPs and the second-type PMI of each subband of the multiple BPs.

Preferably, the step of the UE computing the CQIs of all the selected subbands comprises: the UE computing the CQIs of all the selected subbands according to the RI, the first-type PMI of the multiple BPs and the second-type PMI of each subband of the multiple BPs.

According to another aspect of the present invention, a terminal is provided, comprising: a determining module, configured to determine channel state information which comprises a first-type PMI and/or a second-type PMI according to indication information, wherein the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel; and a feedback module, configured to feed back the first-type PMI in a PUCCH periodically and feed back the second-type PMI in a PUSCH periodically or non-periodically, or, feed back the first-type PMI and the second-type PMI in the PUCCH.

Preferably, the determining module comprises: a transmission determining module, configured to receive high layer configuration signaling information from a base station and determine that a transmission mode of a UE is a mixed transmission mode; a feedback determining module, configured to determine a feedback mode of the UE according to the high layer configuration signaling information; and an information determining module, configured to determine the channel state information which comprises the first-type PMI and/or the second-type PMI according to the determined feedback mode.

Preferably, the mixed transmission mode supports at least one of the following transmission modes: an SU-MIMO transmission mode, an MU-MIMO transmission mode, and an SU-MIMO/MU-MIMO dynamic switching transmission mode.

In accordance with the present invention, the necessary first-type PMI and/or second-type PMI under the transmission mode of dynamic switching of SU-MIMO and MU-MIMO are included in the channel state information, thus increasing the precision of the channel state information fed back by the UE, so that the base station is able to dynamically select the SU-MIMO transmission or the MU-MIMO transmission according to the practical channel condition so as to effectively improve the system performance.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

Figure 1:
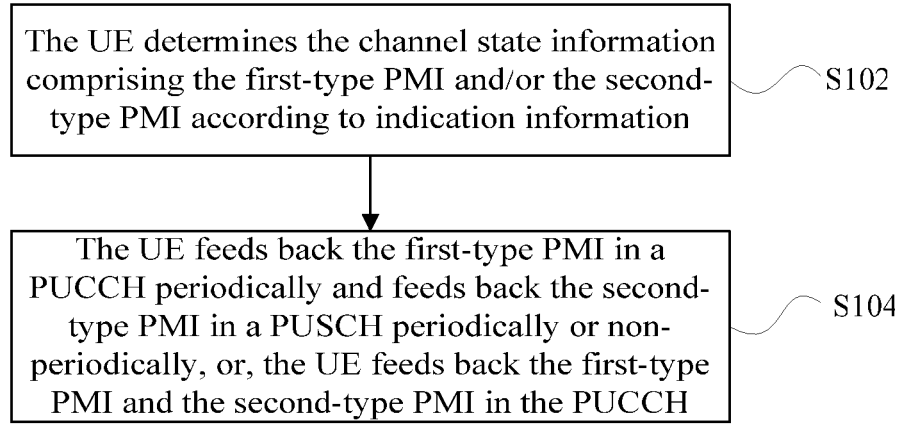
FIG. 1 is a flowchart showing the steps of a method for feeding back channel state information according to an embodiment of the present invention.

The present invention will be described below with reference to the drawings and in conjunction with the embodiments in detail. It should be noted that, in case of no conflict, the embodiments of the present invention and features therein can be combined with each other.

To understand the present invention, channel state information fed back by a UE in the embodiments of the present invention is introduced below first.

The fed-back channel state information comprises: CQI information, PMI information and RI information.

There are various CQI definitions in the LTE, and the CQI can be classified as follows according to different principles:

The CQI can be classified as wideband CQI and subband CQI according to a measurement bandwidth, wherein wideband CQI refers to channel state indication of all subbands and the CQI information of a subband set S is obtained;

subband CQI refers to the CQI information aiming at each subband. According to different system bandwidths, the LTE divides Resource Blocks (RBs) corresponding to an effective bandwidth into several RB groups, each of which is called a subband.

The subband CQI can be further classified as full subband CQI and Best M CQI: the full subband CQI report the CQI information of all subbands; the Best M CQI means that M subbands are selected from the subband set S, the CQI information of these M subbands is reported and the location information of the M subbands is reported simultaneously.

The CQI can be classified as single-stream CQI and dual-stream CQI according to the number of code streams, wherein single-stream CQI: applied to single-antenna transmission port 0 and port 5, transmit diversity, MU-MIMO, R1=1 closed-loop spatial multiplexing, and the UE reports the CQI information of an individual code stream at the moment;

dual-stream CQI: applied to the closed-loop spatial multiplexing mode. For an open-loop spatial multiplexing mode, since the channel state information is unknown and equalization processing is performed for dual-stream channel information during the precoding process, the CQIs of two code streams are equal under the open-loop spatial multiplexing mode.

The CQI can be classified as absolute CQI and differential CQI according to the representation method of the CQI, wherein absolute CQI refers to a CQI index expressed by 4 bits;

differential CQI refers to a CQI index expressed by 2 bits or 3 bits, and the differential CQI is furthered classified as the differential CQI of the second code stream relative to the first code stream, and the differential CQI of a subband CQI relative to another subband CQI.

The CQI can be classified as wideband CQI, UE selected (subband CQI), high layer configured (subband CQI) according to the reporting mode of the CQI, wherein wideband CQI refers to the CQI information of the subband set S;

UE selected (subband CQI), i.e. the Best M CQI feeds back the CQI information of the selected M subbands and reports the locations of the M subbands simultaneously;

high layer configured (subband CQI), i.e. the full subband CQI feeds back one piece of CQI information aiming at each subband.

Both the high layer configured mode and the UE selected mode are feedback modes of the subband CQI, and the subband sizes defined by these two feedback modes are different under the non-periodical feedback mode. Under the UE selected mode, the size of M is further defined, see Table 2 and Table 3.

TABLE 2

Subband size [high layer configured mode]

| System bandwidth $N^{DL}_{RB}$ | Subband size (k) (RBs) |
|---|---|
| 6-7 | NA |
| 8-10 | 4 |
| 11-26 | 4 |
| 27-63 | 6 |
| 64-110 | 8 |

TABLE 3

Subband size and M value [UE selected mode]

| System bandwidth $N^{DL}_{RB}$ | Subband size k (RBs) | M |
|---|---|---|
| 6-7 | NA | NA |
| 8-10 | 2 | 1 |
| 11-26 | 2 | 3 |
| 27-63 | 3 | 5 |
| 64-110 | 4 | 6 |

In the LTE system, the feedback of CQI/PMI and RI can be periodical feedback or non-periodical feedback and the specific feedback is shown in Table 4.

TABLE 4

Uplink physical channels corresponding to periodical feedback and non-periodical feedback

| Scheduling mode | Periodical CQI reporting channel | Non-periodical CQI reporting channel |
|---|---|---|
| Frequency non-selective | PUCCH | |
| Frequency selective | PUCCH | PUSCH |

For the periodically fed-back CQI/PMI and RI, if the UE does not need to send data, the periodically fed-back CQI/PMI and RI are transmitted in a 2/2a/2b (PUCCH format2/2a/2b) format on a PUCCH; if the UE needs to send data, the CQI/PMI and RI are transmitted in a PUSCH. The non-periodically fed-back CQI/PMI and RI can only be transmitted on a PUSCH.

According to a high layer semi-static configuration, the UE feeds back the CQI/PMI/RI information in the PUCCH periodically in the feedback modes shown in Table 5.

TABLE 5

| | | PMI feedback type | |
|---|---|---|---|
| | | No PMI | Single PMI |
| PUCCH CQI feedback type | Wideband (wideband CQI) | Mode 1-0 | Mode 1-1 |
| | UE Selected (subband CQI) | Mode 2-0 | Mode 2-1 |

The PUCCH does not support the higher layer configured (Subband CQI) feedback nor multiple PMI feedback.

In a multi-antenna system, the bit overhead is too high if a channel response matrix is fed back directly. Or decomposition, e.g. Singular Value Decomposition (SVD) is performed for the channel response matrix to obtain the optimal precoding matrix to be fed back, which still results in high overhead. Therefore, some precoding codebook sets, which are known by the transmitting terminal and the receiving terminal, need to be constructed, and the obtained optimal precoding matrix is compared with the coding matrixes in the precoding codebook sets to select an index value corresponding to the closest precoding codebook and feed back the index value. In this way, the bit overhead can be greatly saved, and the fed-back index values of the precoding codebooks are the PMIs.

The feedback granularity of the PMI can be that: one PMI is fed back for the whole bandwidth or the PMI is fed back according to the subband. Two PMI feedback types are defined in the LTE protocol: single PMI and multiple PMIs. The single PMI can express the effective bandwidth $N_{RB}^{DL}$ of the whole system, or can express part of the RB subsets. The number of RBs expressed by the single PMI is configured semi-statically by the high layer.

In a periodic UE selected (subband CQI) feedback mode, a new concept Bandwidth part (BP) is introduced. The BP consists of a number of subbands, wherein the subbands are numbered from the lowest frequency band in an increasing mode of frequency, but subband size (i.e., the number of the contained RBs) follows a non-increasing mode. Similarly, BPs are also numbered from the lowest frequency band in an increasing way of frequency, but BP size (i.e., the number of the contained subbands) follows a non-increasing mode.

The relationship among the subband size, BP size and system bandwidth in the periodic feedback mode is as shown in Table 6:

TABLE 6

| System bandwidth $N^{DL}_{RB}$ | Subband size k (RBs) | BP size (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

As shown in Table 6, $N_{RB}^{DL}$ represents the system bandwidth, if $N_{RB}^{DL} \leq 7$, the UE selected (subband CQI) feedback mode is not supported. The number of subbands corresponding to the system bandwidth $N_{RB}^{DL}$ is $N=\lceil N_{RB}^{DL}/k \rceil$, wherein there are $\lfloor N_{RB}^{DL}/k \rfloor$ subbands, each of which has a size of k, if $\lceil N_{RB}^{DL}/k \rceil - \lfloor N_{RB}^{DL}/k \rfloor > 0$, the size of a certain subband is $N_{RB}^{DL} - k \cdot \lfloor N_{RB}^{DL}/k \rfloor$. J is the number of BPs, and BP j, (j=0, 1, ..., J-1) consists of $N_j$ subbands at continuous frequencies. If J=1, then $N_j = \lceil N_{RB}^{DL}/k/J \rceil$; if J>1, then $N_j = \lceil N_{RB}^{DL}/k/J \rceil$ or $N_j = \lceil N_{RB}^{DL}/k/J \rceil - 1$; and BP j is scanned according to the equation $j = \mod(N_{SF}, J)$ in a sequential order. $N_{SF}$ is a counter at the UE end, and the counter adds 1 after the report and transmission of each subband in the BP. In the UE selected (subband CQI) feedback mode, one subband is selected from $N_j$ subbands of the BP and then fed back, represented by $L = \lceil \log_2 \lceil N_{RB}^{DL}/k/J \rceil \rceil$ bits.

One UE has one first-type PMI and one second-type PMI on one subband. The first-type PMI indicates a matrix W1, and the second-type PMI indicates another matrix W2. A precoding matrix W is a function of the two matrixes W1 and W2. W1 belongs to a codebook C1 and W2 belongs to a codebook C2. The first-type PMI is an index of the codebook C1 and the second-type PMI is an index of the codebook C2, wherein W1 has the wideband/long-term channel information and W2 has the subband/short-term information.

In the embodiments below, the first-type PMI is used for indicating an index of a wideband precoding matrix and the second-type PMI is used for indicating an index of a subband precoding matrix; or the first-type PMI is used for indicating an index of a long-term precoding matrix, and the second-type PMI is used for indicating an index of a short-term precoding matrix; or the first-type PMI is used for indicating an index of a long-term and wideband precoding matrix, and the second-type PMI is used for indicating an index of a short-term and subband precoding matrix; or the first-type PMI is used for indicating an index of a long-term and wideband precoding matrix and an index of a short-term and wideband precoding matrix, and the second-type PMI is used for indicating an index of a short-term and subband precoding matrix The method for feeding back channel state information of the present invention is described in the following embodiments.

Method Embodiment 1

See FIG. 1, which shows a flowchart of the steps of a method for feeding back channel state information according to the embodiment of the present invention, comprising:

Step 102: The UE determines channel state information which comprises a first-type PMI and/or a second-type PMI according to indication information.

For example, the UE determines a transmission mode according to a configuration signaling; in a new mixed transmission mode, the feedback mode is determined according to the configuration signaling; and in the determined feedback mode, the fed-back channel state information at least comprises one of the first-type PMI and the second-type PMI.

In the above, the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel.

The transmission mode is a new mixed transmission mode and at least supports one of the following three transmission modes: SU-MIMO transmission mode, MU-MIMO transmission mode, and SU-MIMO/MU-MIMO dynamic switching transmission mode to meet the needs of the LTE-A system.

Step 104: The UE feeds back the first-type PMI in a PUCCH periodically and feeds back the second-type PMI in a PUSCH periodically or non-periodically, or, the UE feeds back the first-type PMI and the second-type PMI in the PUCCH.

The UE can either feed back the first-type PMI in the PUCCH periodically, and simultaneously feed back the second-type PMI in the PUSCH non-periodically or periodically, or, feed back the first-type PMI and the second-type PMI in the PUCCH periodically.

In the related technology, since the PMIs are not fed back differently, the precision of the fed-back channel state information is insufficient. In the embodiment of the present invention, the distinguished PMIs are included in the contents of the channel state information to greatly increase the precision of the channel state information, thus the base station is able to learn the real-time conditions of the channel according to the fed-back channel state information so that SU-MIMO transmission, MU-MIMO transmission and SU-MIMO/MU-MIMO dynamic switching transmission can be supported to improve the system performance significantly.

Method Embodiment 2

Figure 2:
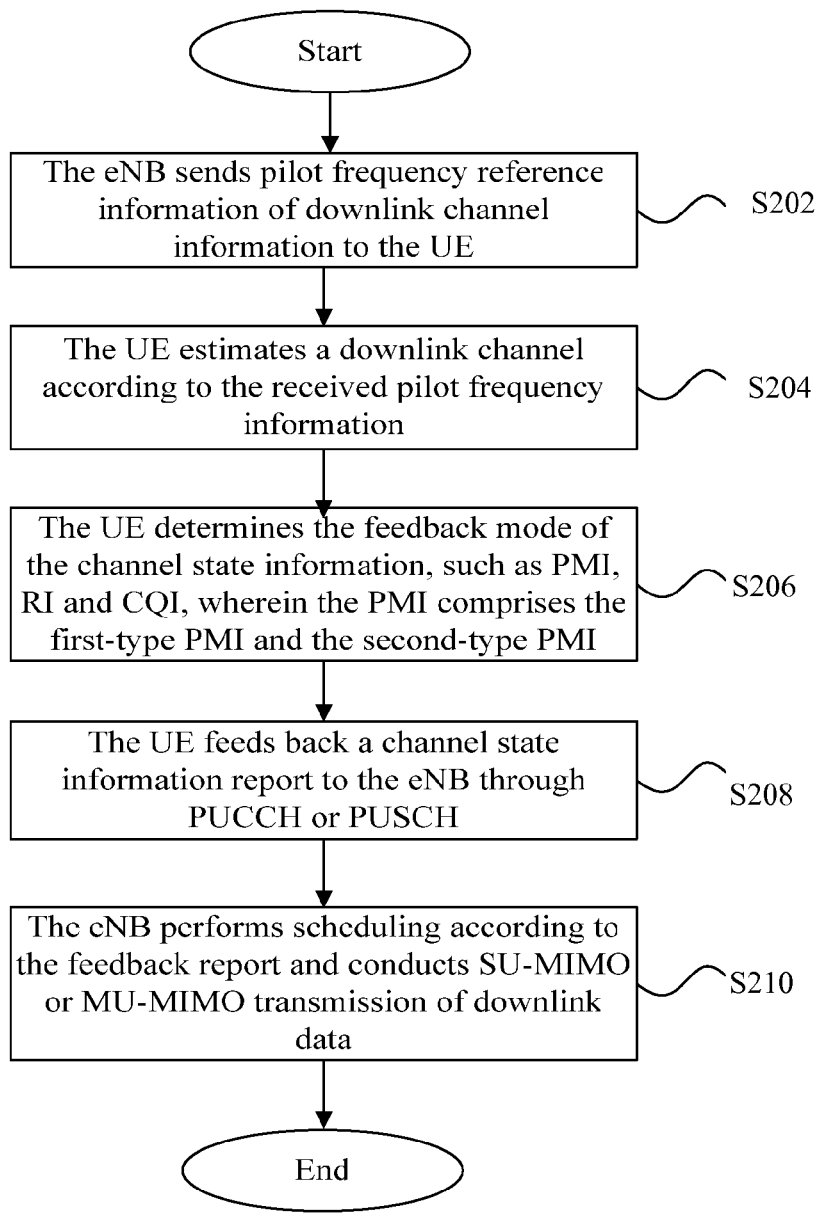
FIG. 2 is a flowchart showing the steps of another method for feeding back channel state information according to an embodiment of the present invention.

See FIG. 2, which shows a flowchart of the steps of another method for feeding back channel state information according to the embodiment of the present invention, comprising:

Step 202: A sending end sends a pilot frequency, which is used for the UE to test a downlink channel state, to a UE.

In this step, the sending end can be a base station (also referred to as an eNodeB).

Step 204: The UE estimates a downlink channel according to the received pilot frequency information.

Step 206: The UE determines a format of a fed-back channel state information report according to indication information.

In this step, the indication information is high layer configuration signalling information. The channel state information can comprise a number of pieces of PMI information, a number of pieces of CQI information and RI information, wherein the PMI information comprises a first-type PMI and a second-type PMI.

Step 208: The UE feeds back the channel state information report to the sending end.

Step 210: The sending end performs scheduling according to the channel state information fed back by the UE to implement the SU-MIMO or MU-MIMO transmission.

Method Embodiment 3

The method for feeding back channel state information in the embodiment comprises steps as follows.

Under a single transmission mode, e.g. the mixed transmission mode etc., according to the indication information, the UE determines the contents carried in the channel state information, wherein the indication information is the high layer configuration signalling information delivered by a base station (also can be referred to as eNodeB).

The UE sends the channel state information to the eNodeB, wherein the channel state information comprises at least one of the followings: a first-type PMI, a second-type PMI, RI and CQI information, wherein the first-type PMI is fed back in the PUCCH periodically, and the second-type PMI is fed back in the PUSCH non-periodically or periodically. The more contents are included in the channel state information, the more easily the information precision can be increased.

In this embodiment, the UE determines a transmission mode according to a configuration signalling. Under a new mixed transmission mode, a feedback mode is determined according to the configuration signalling so as to further determine the contents carried by the channel state information.

In the embodiment, the feedback mode of the first-type PMI is Mode 1-1, i.e., the feedback mode of a wideband CQI and a single PMI; the feedback mode of the first-type PMI is determined by the high layer configuration signaling. In such feedback mode, for a single transmission mode, when an RI is reported in a sub-frame, the UE determines the RI of the whole subband set S and reports the RI information; the UE selects one first precoding matrix from a first precoding codebook sub-set for the subband set S according to the latest reported periodic RI information; the UE periodically reports the following contents: one wideband CQI which is computed based on the first precoding matrix selected for the set S and the latest reported periodic RI, and a wideband PMI which is an index number of the first precoding matrix selected by the UE in the first precoding codebook sub-set; when RI>1, 3 bits of wideband differential CQI is adopted; and in the single transmission mode, the computation of the CQI is based on the latest reported periodic RI information to ensure the real time of the channel state information. Furthermore, the first-type PMI and the RI are fed back in the PUCCH periodically, and the feedback periods of the RI and the first-type PMI are in a multiple relationship, that is, the feedback period of the RI is N times that of the first-type PMI, or, the feedback period of the first-type PMI is N times that of the RI, wherein N is a natural number larger than 0, so as to facilitate the synchronous feedback of the RI and first-type PMI.

In the embodiment, the feedback mode of the second-type PMI in the PUSCH is a Mode 1-2, i.e., the feedback mode of a single CQI and multiple PMIs. In Mode 1-2, the optimal second precoding matrix W2 is selected for each subband from the second precoding codebook sub-set C2; the UE feeds back 4 bits of wideband CQI of each code stream not in a differential CQI format and feeds back the PMI of each subband; and the computation of CQI/PMI in the single transmission mode is based on the feedback of the RI.

Method Embodiment 4

The method for feeding back channel state information in the embodiment comprises steps as follows.

In the single transmission mode, the UE determines the contents carried by the channel state information according to the indication information, wherein the indication information is the high layer configuration signaling information transmitted by a base station (also referred to as eNodeB).

The UE sends the channel state information to the eNodeB, wherein the channel state information comprises at least one of a first-type PMI, a second-type PMI, RI and CQI information, the first-type PMI is fed back in the PUCCH periodically, and the second-type PMI is fed back and transmitted in the PUSCH.

In the embodiment, the feedback mode of the first-type PMI is Mode 1-1, i.e., the feedback mode of a wideband CQI and a single PMI. The feedback mode of the first-type PMI is determined by the high layer configuration signaling. In such a feedback mode, for a single transmission mode, when an RI is reported in a sub-frame, the UE determines the RI of the whole subband set S and reports the RI information; the UE selects one first precoding matrix from the first precoding codebook sub-set for the subband set S according to the latest reported periodic RI information; the UE periodically reports, in respective continuous reporting time, the following contents: a wideband CQI which is computed based on the first precoding matrix selected for the set S and the latest reported periodic RI, and a wideband PMI which is an index number of the first precoding matrix selected by the UE in the first precoding codebook sub-set; when RI>1, 3 bits of wideband differential CQI is adopted; and in the single transmission mode, the computation of the CQI is based on the latest reported periodic RI information. Furthermore, the first-type PMI and the RI are fed back in the PUCCH periodically, and the feedback periods of the first-type PMI and the RI are in a multiple relationship.

In the embodiment, the feedback mode of the second-type PMI in the PUSCH is a Mode 2-2, i.e., the feedback mode of multiple CQIs and multiple PMIs. In Mode 2-2, the optimal second precoding matrix W2 is selected for each subband from the second precoding codebook sub-set C2; the UE feeds back the CQI of each subband in a differential CQI format or an ordinary CQI format and feeds back the PMI of each subband in a differential PMI format or an ordinary PMI format; and the computation of CQI/PMI in the single transmission mode is based on the feedback of the RI.

Method Embodiment 5

The method for feeding back channel state information in the embodiment comprises the steps as follows.

In the single transmission mode, the UE determines the contents carried by the channel state information according to the indication information, wherein the indication information is the high layer configuration signaling information transmitted by the base station (eNodeB).

The UE feeds back the channel state information to the eNodeB, wherein the channel state information comprises at least one of the first-type PMI, the second-type PMI, RI and CQI information, the first-type PMI is periodically fed back in the PUCCH, and the second-type PMI is fed back and transmitted in the PUSCH.

In the embodiment, the feedback mode of the first-type PMI is Mode 0-2, i.e., the feedback mode of no CQI and multiple PMIs. In such a feedback mode, for the single transmission mode, when an RI is reported in a sub-frame, the UE determines the RI of the whole subband set S and reports the RI information; the UE selects at least two first precoding matrixes for the subband set S from the first precoding codebook sub-set according to the latest reported periodic RI information; the UE reports, in respective continuous reporting time, the following contents: no CQI and at least two wideband PMIs; when RI>1, 3 bits of wideband differential CQI is adopted; and in the single transmission mode, the computation of the CQI is based on the latest reported periodic RI information. In the embodiment, the first-type PMI and the RI are periodically fed back in the PUCCH, and the feedback periods of the first-type PMI and the RI are in a multiple relationship.

In the embodiment, the feedback mode of the second-type PMI in the PUSCH is Mode 1-2, i.e., the feedback mode of a wideband CQI and multiple PMIs. In the feedback mode 1-2, i.e., the feedback mode of a wideband CQI and multiple PMIs, the optimal second precoding matrix W2 is selected for each subband from the second precoding codebook sub-set C2; the UE feeds back 4 bits of wideband CQI for each code stream not in a differential CQI format and feeds back the PMI of each subband; and the computation of CQI/PMI in the single transmission mode is based on the feedback of the RI.

Method Embodiment 6

The method for feeding back channel state information in the embodiment comprises the steps as follows.

In the single transmission mode, the UE determines the contents carried by the channel state information according to the indication information, wherein the indication information is the high layer configuration signaling information transmitted by the base station (also referred to as eNodeB).

The UE sends the channel state information to the eNodeB, wherein the channel state information comprises at least one of the first-type PMI, the second-type PMI, RI and CQI information, the first-type PMI is periodically fed back in the PUCCH, and the second-type PMI is fed back and transmitted in the PUSCH; or, both the first-type PMI and second-type PMI are transmitted in the PUCCH. In the embodiment, the feedback modes of the first-type PMI and the second-type PMI are determined by the high layer configuration signaling.

In the embodiment, the feedback mode of the first-type PMI is Mode 0-1, i.e., the feedback mode of no CQI and a single PMI. In such feedback mode, for the single transmission mode, when an RI is reported in a sub-frame, the UE determines the RI of the whole subband set S and reports the RI information; the UE selects one first precoding matrix for the subband set S from the first precoding codebook sub-set according to the latest reported periodic RI information; the UE reports, in respective continuous reporting time, the following contents: no CQI and the wideband PMI which is the index number of the first precoding matrix selected by the UE in the first precoding codebook sub-set; when RI>1, 3 bits of wideband differential CQI is adopted; and in the single transmission mode, the computation of the CQI is based on the latest reported periodic RI information.

Preferably, in the embodiment, the first-type PMI and the RI are periodically fed back in the PUCCH, and the feedback periods of the first-type PMI and the RI are in a multiple relationship.

The second-type PMI can be fed back in any one of the following three modes.

1. The feedback mode of the second-type PMI in the PUSCH is Mode 0-2, i.e., the feedback mode of no CQI and multiple PMIs.

2. The feedback mode of the second-type PMI in the PUSCH is Mode 1-2, i.e., the feedback mode of a single CQI and multiple PMIs.

3. The feedback mode of the second-type PMI in the PUSCH is Mode 2-2, i.e., the feedback mode of multiple CQIs and multiple PMIs.

Method Embodiment 7

The method for feeding back channel state information in the embodiment comprises the steps as follows.

In the single transmission mode, the UE determines the contents carried by the channel state information according to the indication information, wherein the indication information is the high layer configuration signaling information transmitted by the base station (also referred to as eNodeB).

The UE sends the channel state information to the eNodeB, wherein the channel state information comprises at least one of the first-type PMI, the second-type PMI, RI and CQI information, the first-type PMI is periodically fed back in the PUCCH, and the second-type PMI is fed back and transmitted in the PUSCH; or, both the first-type PMI and second-type PMI are transmitted in the PUCCH. In the embodiment, the feedback modes of the first-type PMI and the second-type PMI are determined by the high layer configuration signaling.

In the embodiment, the feedback mode of the first-type PMI is Mode 0-2, i.e., the feedback mode of no CQI and multiple PMIs. In such feedback mode, for the single transmission mode, when an RI is reported in a sub-frame, the UE determines the RI of the whole subband set S and reports the RI information; the UE selects at least two first precoding matrixes for the subband set S from the first precoding codebook sub-set according to the latest reported periodic RI information; the UE reports, in respective continuous reporting time, the following contents: no CQI and at least two wideband PMIs; when RI>1, 3 bits of wideband differential CQI is adopted; and in the single transmission mode, the computation of the CQI is based on the latest reported periodic RI information.

In the embodiment, the first-type PMI and the RI are periodically fed back in the PUCCH, and the feedback periods of the first-type PMI and the RI are in a multiple relationship.

In the embodiment, the second-type PMI can be fed back in any one of the following three modes.

1. The feedback mode of the second-type PMI in the PUSCH is Mode 0-2, i.e., the feedback mode of no CQI and multiple PMIs.

2. The feedback mode of the second-type PMI in the PUSCH is Mode 1-2, i.e., the feedback mode of a single CQI and multiple PMIs.

3. The feedback mode of the second-type PMI in the PUSCH is Mode 2-2, i.e., the feedback mode of multiple CQIs and multiple PMIs.

Method Embodiment 8

The method for feeding back channel state information in the embodiment comprises the steps as follows.

In the single transmission mode, the UE determines the contents carried by the channel state information according to the indication information, wherein the indication information is the high layer configuration signaling information transmitted by the base station (also referred to as eNodeB).

The UE sends the channel state information to the eNodeB, wherein the channel state information comprises at least one of the first-type PMI, the second-type PMI, RI and CQI information, the first-type PMI is periodically fed back in the PUCCH, and the second-type PMI is fed back and transmitted in the PUSCH; or, both the first-type PMI and second-type PMI are transmitted in the PUCCH. In the embodiment, the feedback modes of the first-type PMI and the second-type PMI can be determined by the high layer configuration signaling.

In the embodiment, the first-type PMI can be fed back in the PUCCH in one of the following three modes:

1. Mode 0-1, i.e., the feedback mode of no CQI and a single PMI;
2. Mode 0-2, i.e., the feedback mode of no CQI and multiple PMIs;
3. Mode 1-1, i.e., the feedback mode of a single CQI and a single PMI.

Preferably, the first-type PMI and the RI are periodically fed back in the PUCCH, and the feedback periods of the first-type PMI and the RI are in a multiple relationship.

In the embodiment, the UE can feed back the second-type PMI in the PUCCH in any one of the following three modes.

1. The feedback mode of the second-type PMI in the PUCCH is the feedback mode of no CQI and a single UE-selected subband PMI, In such a feedback mode, the UE determines the RI of the whole subband set S and reports the RI information; the UE selects the optimal subband from $N_j$ subbands of each BP (there are J BPs in total); the UE reports one wideband CQI and one wideband PMI within respective continuous reporting time, wherein the computation of the CQI is based on the latest periodic RI information; the UE reports the subband PMI by a rule that the UE reports the subband PMIs of J subbands selected from J BPs within respective continuous reporting time in turn and reports L-bit subband location identifiers of the selected subbands at the same time. In the single transmission mode, the selection of the optimal subband and its CQI computation are based on the latest RI, the first-type PMI of a full bandwidth and the second-type PMI of each subband. In the embodiment, such feedback mode also comprises a circumstance of not reporting the one wideband CQI and one wideband PMI.

2. The feedback mode of the second-type PMI in the PUCCH is the feedback mode of single UE-selected subband CQI and single UE-selected subband PMI.

In such a feedback mode, the UE determines the RI of the whole subband set S and reports the RI information; the UE reports one wideband CQI and one wideband PMI within respective continuous reporting time, wherein the computation of the CQI is based on the latest periodic RI information; the UE selects the optimal subband from $N_j$ subbands of each BP (there are J BPs in total); the UE reports the subband PMI and subband CQI by the rule that the UE reports the subband PMIs and subband CQIs of J subbands selected from J BPs within respective continuous reporting time in turn and reports L-bit subband location identifiers of the selected subbands at the same time. In the single transmission mode, the selection of the optimal subband and its CQI computation are based on the latest RI, the first-type PMI of a full bandwidth and the second-type PMI of each subband. In the embodiment, such feedback mode also comprises a circumstance of not reporting the one wideband CQI and one wideband PMI.

3. The feedback mode of the second-type PMI in the PUCCH is the feedback mode of the CQI of a BP and the PMI of a single BP.

In such a feedback mode, the UE determines the RI of the whole subband set S and reports the RI information; the UE reports one wideband CQI and one wideband PMI within respective continuous reporting time, wherein the computation of the CQI is based on the latest periodic RI information; the UE reports the PMI and CQI of each BP (there are J BPs in total and each of which consists of $N_j$ subbands) by a rule that the UE reports the PMIs and CQIs of J BPs within respective continuous reporting time in turn and reports L-bit subband location identifiers of the selected subbands at the same time. In the single transmission mode, the selection of the optimal subband and its CQI computation are based on the latest RI, the first-type PMI of a full bandwidth and the second-type PMI of each subband. In the embodiment, such feedback mode also comprises a circumstance of not reporting the one wideband CQI and one wideband PMI, or not reporting the CQI of the BP.

Apparatus Embodiment

Figure 3:
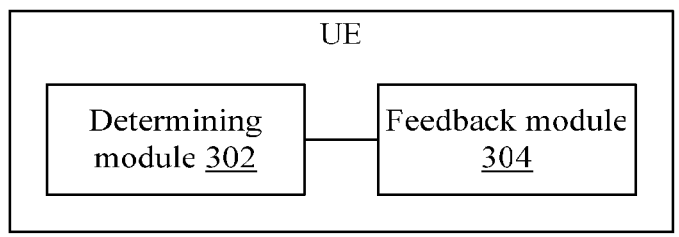
FIG. 3 is a block diagram showing the structure of a terminal according to an embodiment of the present invention.

See FIG. 3, which shows a diagram showing the structure of a terminal according to the embodiment of the present invention, comprising:

a determining module 302, configured to determine channel state information which comprises a first-type PMI and/or a second-type PMI according to indication information, wherein the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel; and a feedback module 304, configured to feed back the first-type PMI in a PUCCH periodically and feedback the second-type PMI in a PUSCH periodically or non-periodically, or, feed back the first-type PMI and the second-type PMI in the PUCCH.

Preferably, the determining module 302 comprises: a transmission determining module, configured to receive high layer configuration signalling information from a base station to determine that a transmission mode of the UE is a mixed transmission mode; a feedback determining module, configured to determine a feedback mode of the UE according to the high layer configuration signalling information; and an information determining module, configured to determine the channel state information which comprises the first-type PMI and/or the second-type PMI according to the determined feedback mode.

Preferably, the mixed transmission mode supports at least one of the following transmission modes: SU-MIMO transmission mode, MU-MIMO transmission mode, and SU-MIMO/MU-MIMO dynamic switching transmission mode.

For example, the determining module 302 of the UE determines that the fed-back channel state information comprises the first-type PMI and/or the second-type PMI according to the indication information received from the base station, and determines to feed back the first-type PMI in the PUCCH periodically and feedback the second-type PMI in the PUSCH by the feedback module 304; or, to feed back the first-type PMI and second-type PMI in the PUCCH by the feedback module 304.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for feeding back channel state information, comprising:
   a piece of User Equipment (UE) determining channel state information which comprises a first-type Precoding Matrix Index (PMI) and a second-type PMI according to indication information, wherein the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel; and
   the UE feeding back the first-type PMI in a Physical Uplink Control Channel (PUCCH) periodically and feeding back the second-type PMI in a Physical Uplink Shared Channel (PUSCH) periodically or non-periodically; or, feeding back the first-type PMI and the second-type PMI in the PUCCH;
   wherein the step of the UE feeding back the first-type PMI in the PUCCH periodically and feeding back the second-type PMI in the PUSCH, or the UE feeding back the first-type PMI and the second-type PMI in the PUCCH comprises:
      the UE feeding back the first-type PMI in the PUCCH periodically and feeding back the second-type PMI in the PUSCH; or
      the UE feeding back the first-type PMI in the PUCCH, and feeding back the second-type PMI in the PUCCH in a mode of single UE-selected subband PMI, or a mode of single UE-selected subband CQI and single UE-selected subband PMI, or a mode of CQI and PMI of a single Bandwidth Part (BP);
   wherein the step of the UE feeding back the second-type PMI in the PUCCH in the mode of single UE-selected subband PMI comprises:
      the UE selecting one subband from each BP in multiple BPs;
      the UE selecting the second precoding matrix corresponding to the one subband selected from each BP from the stored second precoding codebook, and taking an index number of the selected second precoding matrix as the second-type PMI of the one subband of each BP; and
      the UE feeding back, in the PUCCH, the second-type PMI of the one subband selected from each BP in the multiple BPs and a subband location identifier of the subband;
   wherein the step of the UE selecting one subband from each BP in the multiple BPs comprises:
      the UE determining an RI of the multiple BPs; and
      the UE selecting one subband from each BP in the multiple BPs according to the RI, the first-type PMI of the multiple BPs and the second-type PMI of each subband of the multiple BPs;
   wherein the step of the UE feeding back the second-type PMI in the PUCCH in the mode of single UE-selected subband CQI and single UE-selected subband PMI comprises:
      the UE selecting one subband from each BP in multiple BPs;
      the UE selecting the second precoding matrix corresponding to each selected subband from the stored second precoding codebook, and taking an index number of the selected second precoding matrix as the second-type PMI of each selected subband;
      the UE computing CQIs of all selected subbands; and
      the UE feeding back, in the PUCCH, the second-type PMI of each selected subband, the CQIs of all the selected subbands and subband location identifiers of all the subbands;
   wherein the step of the UE selecting one subband from each BP in the multiple BPs comprises:
      the UE determining an RI of the multiple BPs; and
      the UE selecting one subband from each BP in the multiple BPs according to the RI, the first-type PMI of the multiple BPs and the second-type PMI of each subband of the multiple BPs;
   wherein the step of the UE feeding back the second-type PMI in the PUCCH in the mode of CQI and PMI of the single BP comprises:
      the UE selecting one subband from each BP in multiple BPs;
      the UE selecting second precoding matrixes corresponding to all selected subbands from the stored second precoding codebook, and taking index numbers of the selected second precoding matrixes as second-type PMIs of all the selected subbands;
      the UE computing CQIs of all the selected subbands; and
      the UE feeding back, in the PUCCH, the second-type PMIs of all the selected subbands, the CQIs of all the selected subbands and subband location identifiers of all the selected subbands;
   wherein the step of the UE selecting one subband from each BP in the multiple BPs comprises:
      the UE determining an RI of the multiple BPs; and
      the UE selecting one subband from each BP in the multiple BPs according to the RI, the first-type PMI of the multiple BPs and the second-type PMI of each subband of the multiple BPs.

2. The method according to claim 1, wherein the channel state information further comprises: Rank Indicator (RI) information and/or Channel Quality Indication (CQI) information.

3. The method according to claim 1, wherein the step of the UE feeding back the first-type PMI in the PUCCH periodically and feeding back the second-type PMI in the PUSCH periodically or non-periodically; or, feeding back the first-type PMI and the second-type PMI in the PUCCH comprises:
   the UE feeding back the first-type PMI in the PUCCH periodically in a Mode 1-1, or a Mode 0-1, or a Mode 0-2, and feeding back the second-type PMI in the PUSCH;
   or,
   the UE feeding back the first-type PMI in the PUCCH in a Mode 1-1, or a Mode 0-1, or a Mode 0-2 and feeding back the second-type PMI in the PUCCH;
   or,
   the UE feeding back the first-type PMI in the PUCCH periodically, and feeding back the second-type PMI in the PUSCH in a Mode 1-2 or a Mode 2-2;

or,
the UE feeding back the first-type PMI and the second-type PMI in the PUCCH.

4. The method according to claim 3, wherein the step of the UE feeding back the first-type PMI in the PUCCH periodically in the Mode 1-1 comprises:
the UE selecting the first precoding matrix corresponding to a single wideband from the stored first precoding codebook using a latest RI, and taking an index number of the selected first precoding matrix as the first-type PMI of the single wideband;
the UE computing a CQI of the single wideband using the latest RI; and
the UE feeding back the CQI of the single wideband and the first-type PMI of the single wideband in the PUCCH periodically.

5. The method according to claim 3, wherein the step of the UE feeding back the first-type PMI in the PUCCH periodically in the Mode 0-1 comprises:
the UE selecting the first precoding matrix corresponding to a single wideband from the stored first precoding codebook using a latest RI, and taking an index number of the selected first precoding matrix as the first-type PMI of the single wideband; and
the UE feeding back the first-type PMI of the single wideband in the PUCCH periodically.

6. The method according to claim 3, wherein the step of the UE feeding back the first-type PMI in the PUCCH periodically in the Mode 0-2 comprises:
the UE selecting multiple first precoding matrixes respectively corresponding to multiple widebands from the stored first precoding codebook using a latest RI, and taking index numbers of the selected multiple first precoding matrixes as multiple first-type PMIs of the multiple widebands; and
the UE feeding back the multiple first-type PMIs of the multiple widebands in the PUCCH periodically.

7. The method according to claim 3, wherein the step of the UE feeding back the first-type PMI in the PUCCH periodically in the Mode 0-2 comprises:
the UE selecting the first precoding matrix corresponding to each subband in multiple widebands from the stored first precoding codebook using a latest RI, and taking an index number of the selected first precoding matrix as the first-type PMI of each subband in the multiple widebands; and
the UE feeding back, in the PUCCH, the first-type PMI of each subband in the multiple widebands periodically.

8. The method according to claim 3, wherein the step of the UE feeding back the second-type PMI in the PUSCH in the Mode 1-2 comprises:
the UE selecting the second precoding matrix corresponding to each subband in multiple widebands from the stored second precoding codebook, and taking an index number of the selected second precoding matrix as the second-type PMI of each subband in the multiple widebands;
the UE computing a wideband CQI of each code stream of the multiple widebands using a latest RI, wherein the CQI adopts a non-differential CQI format; and
the UE feeding back wideband CQIs of the multiple widebands and the second-type PMI of each subband of the multiple widebands in the PUSCH.

9. The method according to claim 3, wherein the step of the UE feeding back the second-type PMI in the PUSCH in the Mode 2-2 comprises:
the UE selecting the second precoding matrix corresponding to each subband in multiple widebands from the stored second precoding codebook, and taking an index number of the selected second precoding matrix as the second-type PMI of each subband in the multiple widebands;
the UE computing a CQI of each subband in the multiple widebands using a latest RI, wherein the CQI adopts a differential CQI format or an ordinary CQI format; and
the UE feeding back, in the PUSCH, the CQI of each subband in the multiple widebands and the second-type PMI of each subband in the multiple widebands.

10. The method according to claim 1, wherein the step of the UE computing the CQIs of all the selected subbands comprises:
the UE computing the CQIs of all the selected subbands according to the RI, the first-type PMI of the multiple BPs and the second-type PMI of each subband of the multiple BPs.

11. A terminal, comprising:
a determining module, configured to determine channel state information which comprises a first-type PMI and a second-type PMI according to indication information, wherein the first-type PMI is used for indicating an index of one first precoding matrix in a first precoding codebook, and each first precoding matrix is used for mapping channel information of one wideband and/or long-term channel; and the second-type PMI is used for indicating an index of one second precoding matrix in a second precoding codebook, and each second precoding matrix is used for mapping channel information of one subband and/or short-term channel; and
a feedback module, configured to feed back the first-type PMI in a PUCCH periodically and feedback the second-type PMI in a PUSCH periodically or non-periodically, or, feedback the first-type PMI and the second-type PMI in the PUCCH;
wherein the feedback module is also configured to feedback the first-type PMI in the PUCCH periodically and feeding back the second-type PMI in the PUSCH; or,
feedback the first-type PMI in the PUCCH, and feedback the second-type PMI in the PUCCH in a mode of single UE-selected subband PMI, or a mode of single UE-selected subband CQI and single UE-selected subband PMI, or a mode of CQI and PMI of a single Bandwidth Part (BP);
wherein the step of feeding back the second-type PMI in the PUCCH in the mode of single UE-selected subband PMI comprises:
selecting one subband from each BP in multiple BPs;
selecting the second precoding matrix corresponding to the one subband selected from each BP from the stored second precoding codebook, and taking an index number of the selected second precoding matrix as the second-type PMI of the one subband of each BP; and
feeding back, in the PUCCH, the second-type PMI of the one subband selected from each BP in the multiple BPs and a subband location identifier of the subband;
wherein the step of selecting one subband from each BP in the multiple BPs comprises:
determining an RI of the multiple BPs; and
selecting one subband from each BP in the multiple BPs according to the RI, the first-type PMI of the multiple BPs and the second-type PMI of each subband of the multiple BPs;

wherein the step of feeding back the second-type PMI in the PUCCH in the mode of single UE-selected subband CQI and single UE-selected subband PMI comprises:
selecting one subband from each BP in multiple BPs;
selecting the second precoding matrix corresponding to each selected subband from the stored second precoding codebook, and take an index number of the selected second precoding matrix as the second-type PMI of each selected subband;
computing CQIs of all selected subbands; and
feeding back, in the PUCCH, the second-type PMI of each selected subband, the CQIs of all the selected subbands and subband location identifiers of all the subbands;
wherein the step of selecting one subband from each BP in the multiple BPs comprises:
determining an RI of the multiple BPs; and
selecting one subband from each BP in the multiple BPs according to the RI, the first-type PMI of the multiple BPs and the second-type PMI of each subband of the multiple BPs;
wherein the step of feeding back the second-type PMI in the PUCCH in the mode of CQI and PMI of the single BP comprises:
selecting one subband from each BP in multiple BPs;
selecting second precoding matrixes corresponding to all selected subbands from the stored second precoding codebook, and take index numbers of the selected second precoding matrixes as second-type PMIs of all the selected subbands;
computing CQIs of all the selected subbands; and
feeding back, in the PUCCH, the second-type PMIs of all the selected subbands, the CQIs of all the selected subbands and subband location identifiers of all the selected subbands;
wherein the step of selecting one subband from each BP in the multiple BPs comprises:
determining an RI of the multiple BPs; and
selecting one subband from each BP in the multiple BPs according to the RI, the first-type PMI of the multiple BPs and the second-type PMI of each subband of the multiple BPs.

12. The terminal according to claim 11, wherein the determining module comprises:
a transmission determining module, configured to receive high layer configuration signalling information from a base station and determine that a transmission mode of a UE is a mixed transmission mode;
a feedback determining module, configured to determine a feedback mode of the UE according to the high layer configuration signalling information; and
an information determining module, configured to determine the channel state information which comprises the first-type PMI and/or the second-type PMI according to the determined feedback mode.

* * * * *